United States Patent [19]

Todt, Sr.

[11] 4,086,490
[45] Apr. 25, 1978

[54] WIDE RANGE NEUTRON DETECTION SYSTEM

[75] Inventor: William H. Todt, Sr., Elmira Heights, N.Y.

[73] Assignee: Westinghouse Electric Corporation, Pittsburgh, Pa.

[21] Appl. No.: 703,156

[22] Filed: Jul. 7, 1976

[51] Int. Cl.² .......................... G01T 1/18; G01T 3/00
[52] U.S. Cl. .................................... 250/385; 250/390
[58] Field of Search ................ 250/385, 390, 391, 392

[56] References Cited

U.S. PATENT DOCUMENTS

| 3,311,770 | 3/1967 | Boyd | 250/390 X |
| 3,335,277 | 8/1967 | Schmid et al. | 250/390 X |
| 3,898,466 | 8/1975 | Kawashima | 250/390 |

Primary Examiner—Davis L. Willis
Attorney, Agent, or Firm—W. G. Sutcliff

[57] ABSTRACT

A neutron detection system is described which is operable over a wide range of neutron flux levels. The system includes a fission type ionization chamber neutron detector, means for gamma and alpha signal compensation, and means for operating the neutron detector in the pulse counting mode for low neutron flux levels, and in the direct current mode for high neutron flux levels.

7 Claims, 3 Drawing Figures

WIDE RANGE NEUTRON DETECTION SYSTEM

BACKGROUND OF THE INVENTION

The present invention is directed to nuclear reactor control instrumentation systems. More particularly, the invention is directed to a neutron detection system, which is operable to detect thermal neutron fluxes over a wide range of flux levels. In the past, it has been found necessary to use a variety of different neutron detectors to cover the entire range of neutron flux levels for a typical light water reactor. For high neutron flux levels, direct current operation mode ionization chamber detectors have been utilized, while for low neutron flux levels, a proportional counter detector operated in the pulse mode has been utilized. The ionization chamber can be gamma compensated to improve the accuracy of the signal level.

The fission chamber is an ionization chamber type neutron detector which is gas filled, and which is used to detect neutron flux by the reaction of penetrating thermal neutrons with an amount of fissionable material which is included within the device. Fissionable material may typically be uranium 235. The fission fragments released by the reaction with the thermal neutrons ionize the fill gas which will result in detection of a pulse signal in low flux levels whereas an average DC current signal is measured at high flux levels. The direct current mode of operation of such fission chamber devices is limited at the maximum flux level, typically about $10^{10}$ neutrons per square centimeter per second, by the saturation characteristics of the detector. The minimum detectable neutron flux level in the direct current mode of operation is typically about $10^6$ neutrons per square centimeter per second, and is determined by the direct current alpha signal background current in the chamber. The pulse counting mode of operation is limited at the upper level of about $10^5$ counts per second by the resolution of individual pulses in the chamber, and at the lower level of one count per second by background radiation and/or counting statistics. These modes of operation do not overlap and two separate detector chambers are required to form a system which covers the entire operational neutron flux range for a typical reactor control system.

It is desirable to be able to utilize a single detector which can effectively cover the entire range of neutron flux in an operational reactor to minimize the number of components and the space requirements.

A variety of gamma compensated ionization chamber designs are well known in the art such as U.S. Pat. No. 2,852,694. A variety of alpha particle compensation means for neutron detectors are also well known in the art.

SUMMARY OF THE INVENTION

A wide range neutron detection system is detailed which is operable over a neutron flux range of from about 1 to $10^{10}$ neutrons per square centimeter per second. A fission type ionization chamber neutron detector is gamma compensated and includes means minimizing the alpha particle signal effects on the neutron measurement. The system includes means for operating the neutron detector in the pulse counting mode for low neutron flux levels, and in the direct current mode for high neutron flux levels.

In a preferred embodiment, the fission type ionization chamber and neutron detector is provided with integral gamma and alpha compensation means.

DESCRIPTION OF THE PREFERRED EMBODIMENTS

Figure 1:
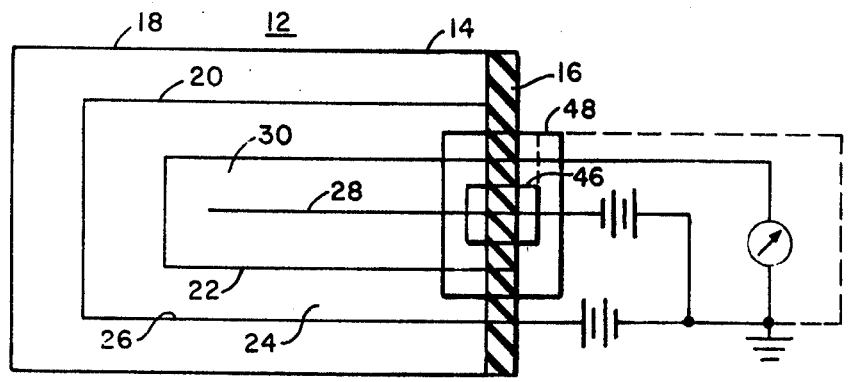
FIG. 1 is a schematic cross-sectional representation of a gamma compensated fission chamber utilizable in the system of the present invention.
Figure 2:
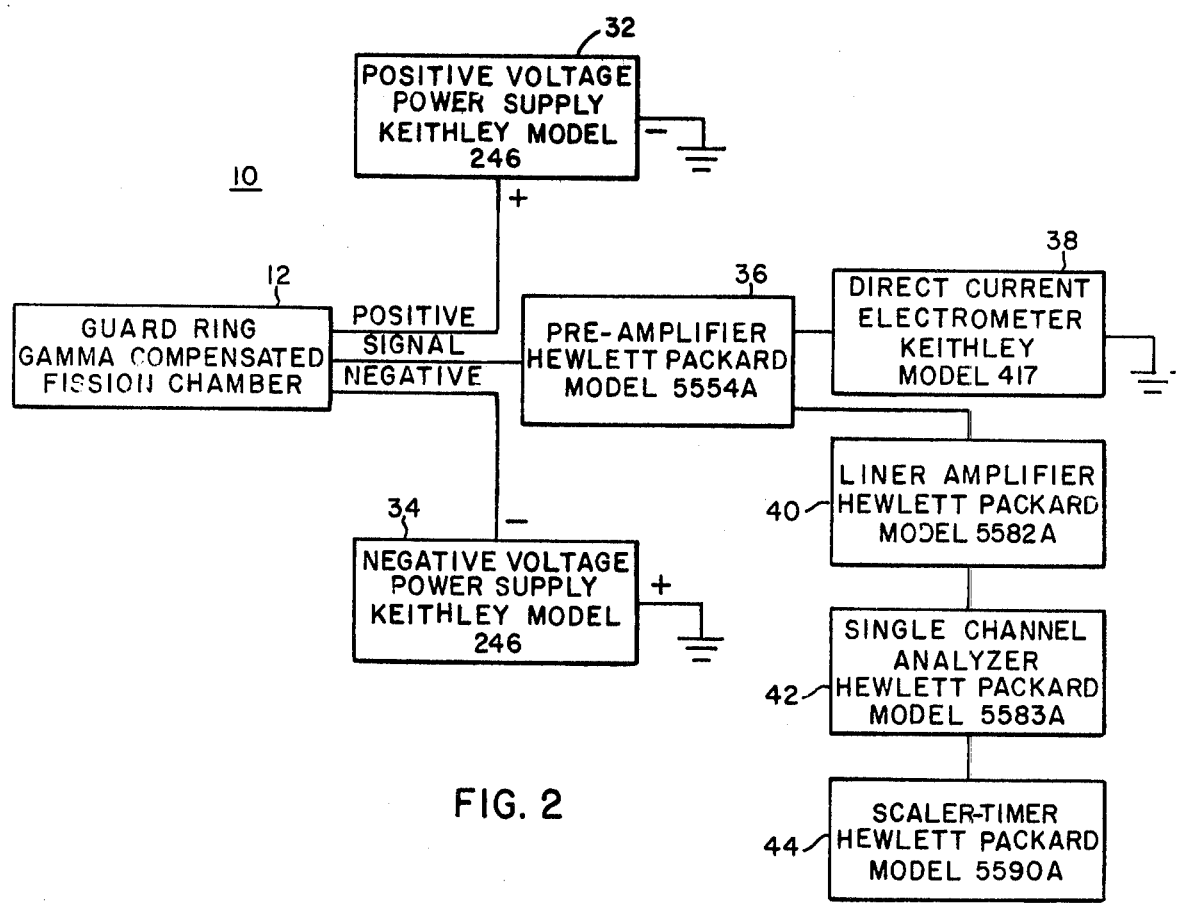
FIG. 2 is a schematic representation of the neutron detection system of the present invention.

The neutron detection system 10 is seen clearly in FIG. 2 and a fission-type neutron detector 12 is illustrated in greater detail in FIG. 1. The fission-type ionization chamber neutron detector 12 comprises a hermetically-sealed envelope 14 which includes an insulated base 16 and a thin conductive generally tubular envelope 18. A first high-voltage electrode 20 is disposed coaxially within the envelope 18 with a second electrode 22 coaxially spaced within the first electrode 20 with the volume defined between and comprising the neutron detection chamber 24. A small amount of fissionable uranium oxide 26 is provided on the interior surface of the first electrode 20. A centralized electrode 28 is provided within the gamma compensation chamber 30 defined by the second electrode 22. In one embodiment of the present invention a small amount of alpha particle emissive isotope such as radium 226 is disposed within the gamma compensation chamber 22 or 30 to provide an alpha compensation means integral with the gamma compensation chamber.

Figure 3:
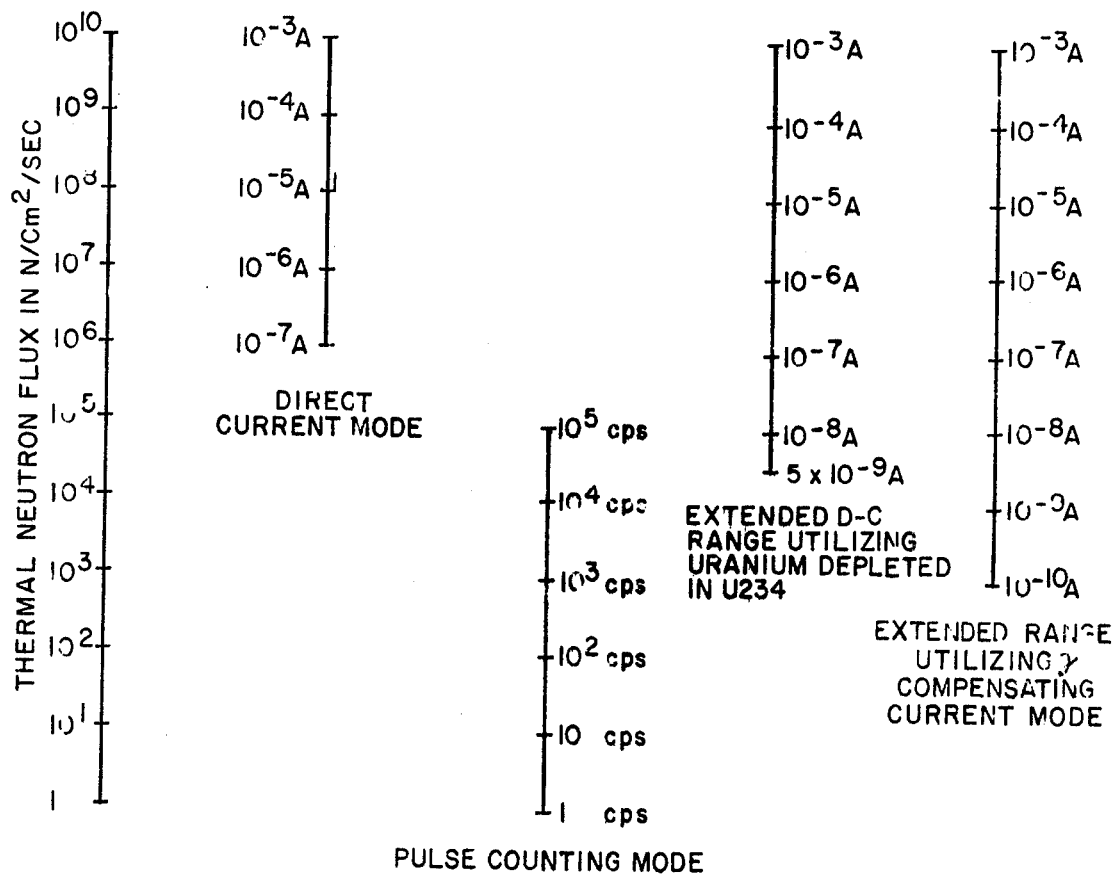
FIG. 3 is a graphic illustration of the range of neutron flux levels present in a typical nuclear reactor and of the extent to which the range of operation of the fission chamber detector can be extended to cover the entire range.

The neutron detection system 10 includes a positive voltage power supply means 32 which is connected to the first high voltage electrode 20. A negative high voltage power supply 34 is connected to the central electrode 28. The operating signal is derived from the second electrode 22 which is connected to a signal preamplifier means 36. When the detector is operated in the high neutron flux level range, a DC mode of operation is employed and the signal output from the preamplifier means 36 is directed to a direct current electrometer means 38. A current signal level is derived from such an electrometer means 38 which is indicative of a thermal neutron flux level. Such signal levels are seen in FIG. 3. When the neutron detection system is utilized for low neutron flux level measurements the system is operated in a pulse counting mode of operation and the output signal of the preamplifier means 36 is fed to linear amplifier means 40 with the amplified signal being directed to single channel analyzer means 42 and to scaler-timer means 44.

The basic concept of the present invention is to utilize a single fission type chamber neutron detector which can be gamma compensated and the alpha signal effect minimized to permit the detector to operate over the full range of neutron flux levels present in operating reactors. The gamma compensation is typically provided by including a gamma compensation chamber in the detector, however, it is possible to generate a gamma compensation signal in the external circuitry. A variety of alpha signal compensation means or alpha signal minimizing means can be employed in practicing the present invention.

It has been discovered that extension of the lower range of the DC current operating level for a fission chamber type detector can be had by reducing the inherent DC alpha background current level in the detector. The uranium content of the fission chamber typically consists of four naturally radioactive isotopes of uranium. The greatest proportion of the uranium is present as uranium 235 with a modest amount of uranium 238 present and very small amounts of uranium 234 and uranium 236 being present. It has been discovered that the uranium 234 is the primary contributor to alpha background current levels due to its relatively short half life (2.47 × $10^5$ years) compared with the other uranium isotopes present. The uranium 234 material has a fission threshold of approximately 0.1 MEV and is therefore not very useful for detection of thermal neutrons. It has therefore been found highly desirable to minimize or eliminate the amount of uranium 234 isotope present in the fission chamber. If one utilizes uranium depleted to less than 100 parts per million of uranium 234, this will reduce the alpha current contribution of the uranium 234 isotope, and reduce the total inherent alpha background by a factor of approximately 20. Such a uranium 234 depleted fission chamber will have an extended useful range to about 5 × $10^4$ neutrons per square centimeter per second. Such an extended range of operation is seen in FIG. 3. It can be seen that for such a device which is depleted in uranium 234, the direct current mode of operation overlaps with the pulse counting mode of operation to fully cover the 10 decade range of thermal neutron flux levels present in nuclear reactors.

An alternative method for extending the DC range of a commercial fission chamber neutron detector is to utilize a compensating signal current in the external DC circuit to null the effects of the inherent alpha background level. A commercially available DC picoammeter such as the Keithley Model 417 includes a special circuit for suppressing background current. By suppressing the inherent alpha background current of 2 × $10^{-8}$ amperes, neutron signal current levels in the $10^{-10}$ ampere range may be measured.

In typical light water nuclear reactors, a mixed radiation neutron and gamma field are typically incident on out-of-core radiation detectors. In the direct current operating mode, a fission chamber neutron detector typically is operable down to a flux range of about $10^6$ NV due to the gamma background signal generated in the chamber by the high gamma flux incident from residual activation of the core material. Utilization of a gamma compensated chamber can extend the useful operating range down to $10^4$ NV and thus provide an overlap with the pulse mode of operation.

In the embodiment of FIG. 1, conventional annular guard ring electrodes 46 and 48 extend through the base 16 a short distance into respective chambers 30 and 24. The guard ring electrode 46 is between the centralized electrode 28 and the second electrode 22, while guard ring electrode 48 is between the second electrode 22 and the first electrode 20. Such guard ring electrodes are well known in the art, and are grounded to provide greater device signal sensitivity.

What is claimed is:

1. A wide range neutron detection system which is operable over the neutron flux range of 1 to $10^{10}$ neutrons per square centimeter per second in which a fission type ionization chamber neutron detector is gamma compensated and includes means for minimizing the effects of alpha signals generated in the detector, and means for operating the neutron detector in the pulse counting mode for low neutron flux levels and in the direct current mode for high neutron flux levels.

2. The detection system specified in claim 1, wherein gamma compensation is provided by providing a gamma compensation chamber as part of the fission type ionization chamber neutron detector.

3. The detection system specified in claim 2, wherein the means for minimizing alpha signal effects comprises a selected amount of low neutron cross section, alpha particle emissive isotype disposed within the gamma compensation chamber as an alpha signal compensation means.

4. The detection system specified in claim 3, wherein the alpha signal produced by the fission type ionization chamber is minimized by using uranium oxide fission material which is depleted in uranium 234 content.

5. The detection system specified in claim 4, wherein the uranium 234 content is less than about 100 parts per million.

6. The detection system specified in claim 1, wherein the alpha signal effect is minimized by applying a compensating signal current in the external biasing circuitry.

7. A wide range neutron detection system which is operable over a wide range of neutron flux levels comprising a fission type ionization chamber neutron detector with integral gamma and alpha compensation, wherein a gamma compensation chamber is included as a part of the fission type ionization chamber neutron detector to provide gamma compensation, and a selected amount of low neutron cross section, alpha particle emissive isotope is disposed within the gamma compensation chamber to provide alpha compensation, and means for operating the neutron detector in the pulse counting mode for low neutron flux levels and in the direct current mode for high neutron flux levels.

* * * * *